Figure 1:
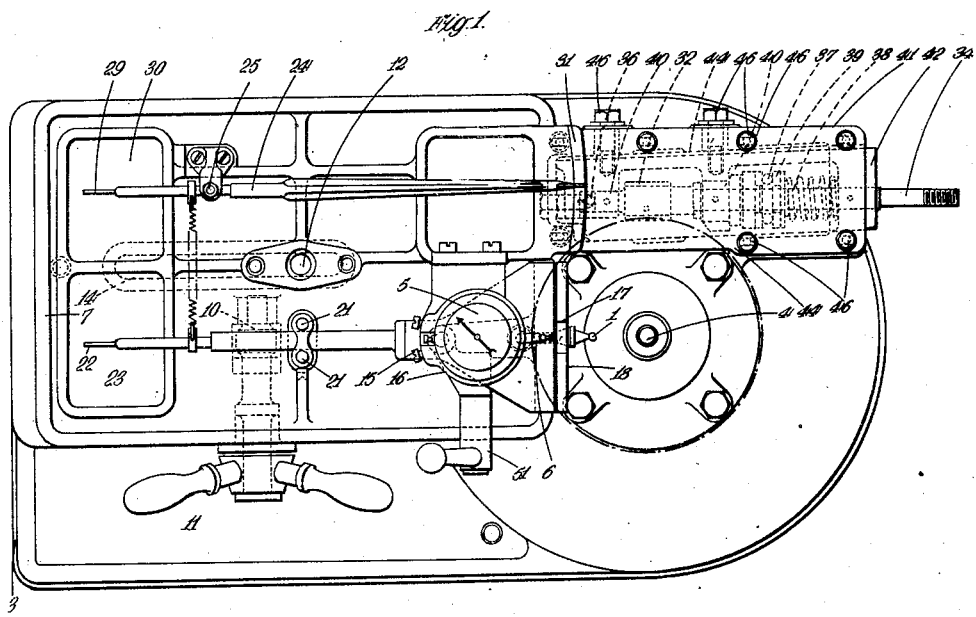

April 6, 1926.　　　　　　　　　　　　　　　　　1,580,081
A. C. WICKMAN
MACHINE FOR MEASURING; GAUGING, OR THE LIKE
Filed July 30, 1921　　　3 Sheets-Sheet 1

April 6, 1926.
A. C. WICKMAN
1,580,081
MACHINE FOR MEASURING, GAUGING, OR THE LIKE
Filed July 30, 1921  3 Sheets-Sheet 2
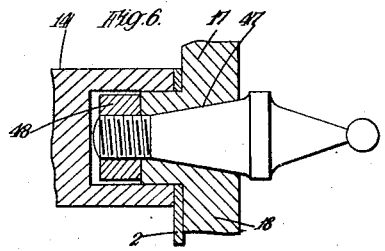
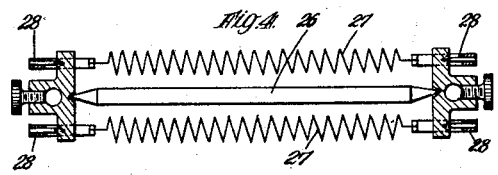
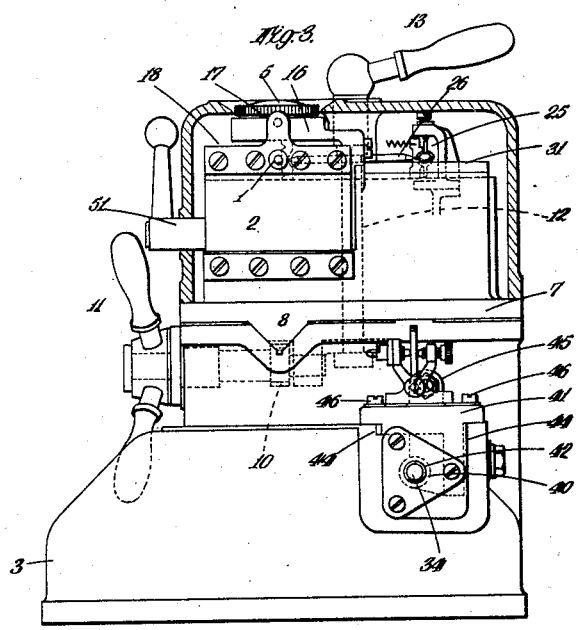

April 6, 1926.
A. C. WICKMAN
1,580,081
MACHINE FOR MEASURING, GAUGING, OR THE LIKE
Filed July 30, 1921    3 Sheets-Sheet 3
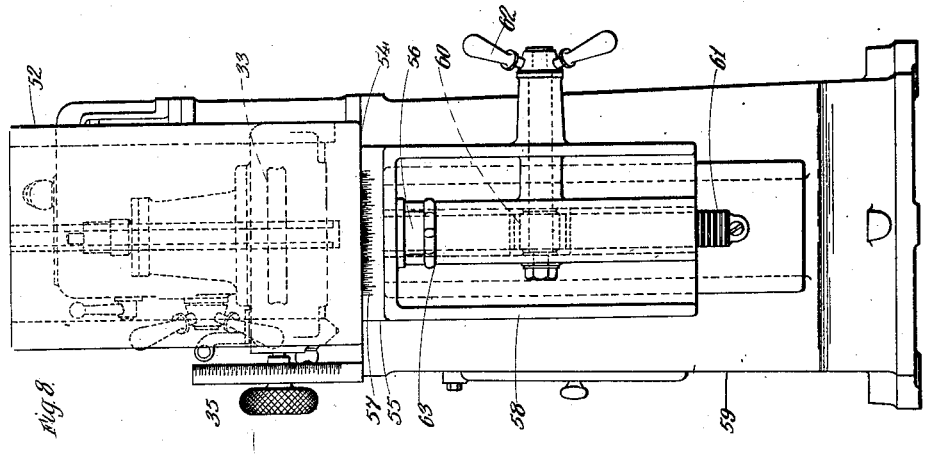
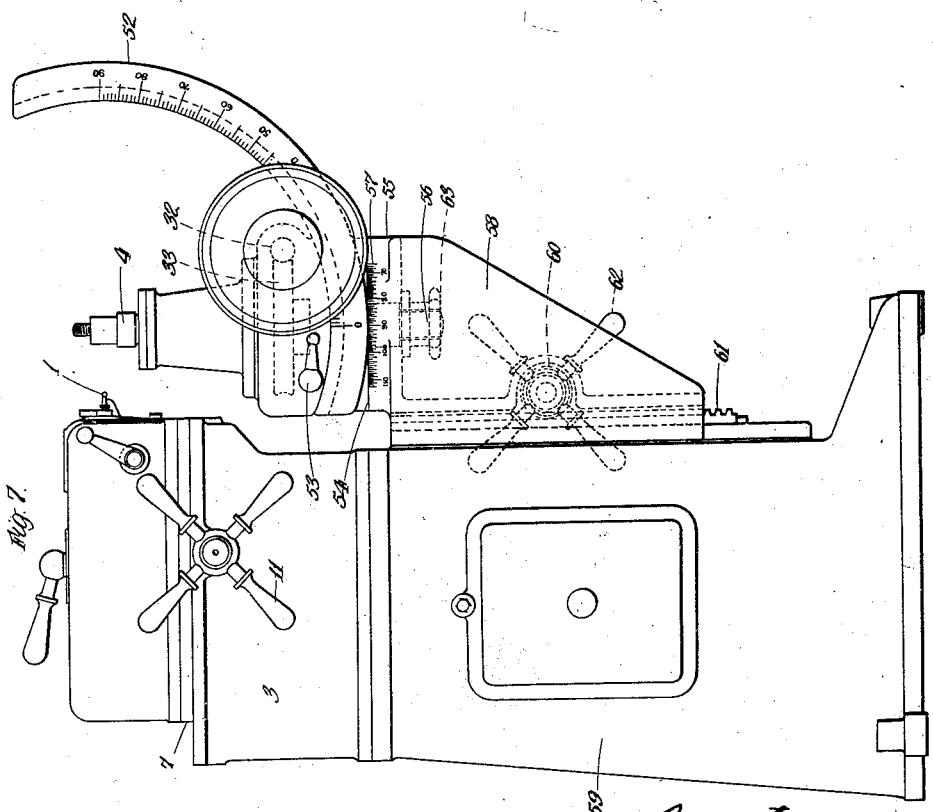

Patented Apr. 6, 1926.

1,580,081

UNITED STATES PATENT OFFICE.

AXEL CHARLES WICKMAN, OF LEAMINGTON, ENGLAND.

MACHINE FOR MEASURING, GAUGING, OR THE LIKE.

Application filed July 30, 1921. Serial No. 488,584.

*To all whom it may concern:*

Be it known that I, AXEL CHARLES WICKMAN, a subject of the King of Great Britain, residing at 17 Avenue Road, Leamington, in the county of Warwick, England, have invented certain new and useful Improvements in or Relating to Machines for Measuring, Gauging, or the like, of which the following is a specification.

The present invention relates to machines for measuring, gauging, or testing, and its main object is to provide a machine by which the concentricity of, or parts of, projections arranged around a center such as the teeth of gear wheels, and preferably also the pitch thereof, may be gauged or tested and any variation therein measured.

In a machine embodying the present invention there is employed a resiliently mounted or controlled member (usually and hereinafter referred to as a stylus) which is caused to bear against the work, the said stylus being mounted in such manner as to be displaceable against resilience in a direction substantially normal to the work and also transversely to the said direction and there is operatively combined with the stylus a gauge, such for example as that known as a dial gauge, to indicate any variation in the position of the stylus in a direction substantially normal to the work and independently of any displacement of the stylus transversely to that direction, and means enabling the surface of the work to be passed in contact with the stylus, the said mounting of the stylus allowing it to enter successively recesses in the work and retire therefrom as the work is operated, the transverse movement of the stylus in so acting not interfering in any way with the indication of its displacement or position in a direction substantially normal to the work. Thus if the stylus be so shaped with its extremity when between, for instance, two gear teeth makes contact with them at or about the pitch circle at other parts any variation from the concentricity of the pitch circle is indicated when the stylus is similarly engaged at those parts. The stylus may also operate or be movable in a lateral manner and may be connected with the first lever of a system of multiplying levers (of which there would be preferably two) or other means to indicate lateral movement, or relative position of the stylus. The dial or other gauge before referred to may be located horizontally above and its horizontal operating reciprocating member may abut against or near to the member to which the stylus is secured. As therefore the stylus rises from and enters the space between two teeth for instance, the degree to which this movement takes place is indicated by the dial or other gauge. A rotary vertical mandrel may be provided on which the gear wheel or the like may be removably but accurately clamped horizontally and means are provided for rotating the said mandrel so that the teeth of the gear or the like may be passed across the stylus in succession. The stylus, dial gauge and connections are preferably mounted on a slidable carriage which by rack and pinion gear may be moved forwards to bring the stylus up to the work or cause it to retire therefrom and a clamp is provided to secure the carriage in its adjusted position. The acting part of the stylus may be made of spherical form and provision may be made for the use of interchangeable styli. The mandrel aforesaid may be rotated by worm and worm wheel gear and by the use of a micrometer dial in connection with the worm shaft this gear may be used as a micrometer for indicating any variation in the pitch of the teeth or the like, in combination with the use of the free end of the second or last lever of the system of multiplying levers actuated or controlled by lateral movement or position of the stylus, as a pointer coacting with a fixed scale or zero indication. For convenience in some cases the micrometer dial is mounted so that it may be either secured or released and removed, and differently graduated dials are preferably provided for different diameters of gear wheels within the range of capacity of the machine. The multiplying levers preferably carry vanes immersed in suitable bodies of viscous liquid to steady their action. In order to secure the stylus lever while a stylus is being removed or placed in position a vertical passage may be provided in the said lever into which a pin may be caused to enter by manipulative means. Arrangements are also made in some cases for tilting the mandrel for holding the work in two different planes for dealing with helical and bevel gears and the like.

In order that the said invention may be clearly understood and readily practiced it is hereinafter more particularly described with reference to the accompanying drawings which illustrate by way of example the preferred embodiments thereof.

Figure 1 of the said drawings is a plan of the machine, Figure 2 a sectional side elevation and Figure 3 an end view partly in section, Figures 4, 5 and 6 show details hereinafter referred to and Figures 7 and 8 show in side view and end view a modified arrangement wherein the mandrel for the work may be tilted to suit helical and bevel gears and the like.

In the following description the parts of the said figures are referred to by the numerals marked thereon the same numerals of reference indicating the same or equivalent parts in all the figures.

Figure 2:
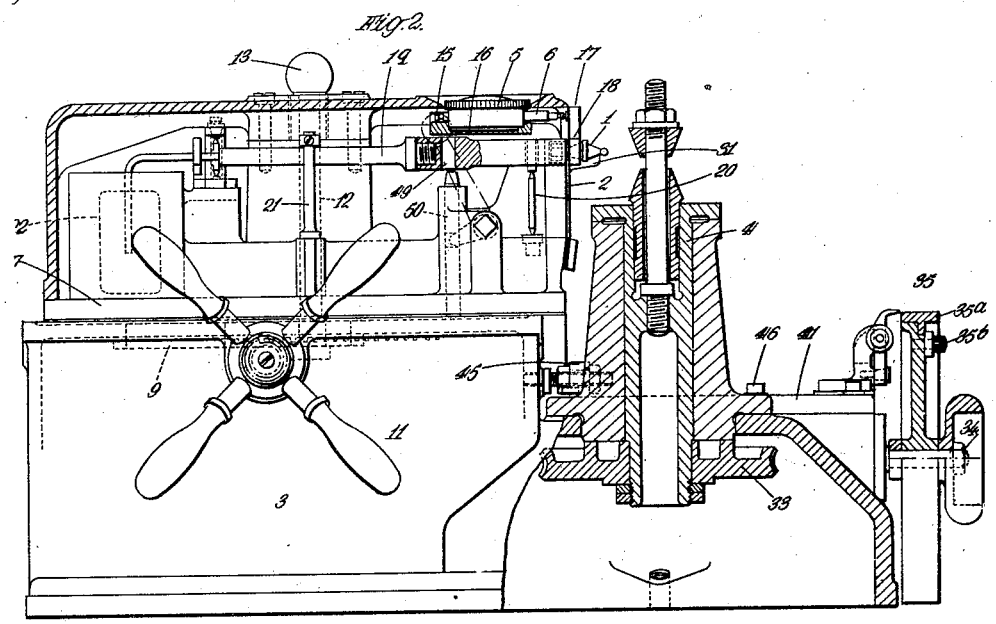

The machine illustrated in Figures 1, 2, and 3 is designed for dealing with the concentricity of the pitch circle or teeth of gear wheels, particularly spur gears.

1 is the stylus which has a spherical extremity of a diameter the same or a little greater or a little less than the width of the correct or designed space between the teeth at the pitch line or circle. 2 is a resilient blade spring mounting for the stylus the said mounting being similar to that used in the known machines for testing the pitch of a screw thread. 3 is the base of the machine. 4 is the rotary mandrel on which the gear to be tested or gauged is concentrically clamped. 5 is the dial gauge before referred to actuated or controlled by axial movement of the stylus and 6 is the horizontally acting operating member of the gauge. The stylus, gauge 5, and other parts in association therewith are mounted in a carriage 7 slidable on a part of the base 3 a V bearing being provided between them at 8. The underside of the carriage between the two end V bearing surfaces on the carriage is provided with a toothed rack 9 which meshes with a pinion 10 mounted on a rotatable shaft provided with handles 11. This gearing enables the stylus to be moved up to the work according to its diameter and the carriage and parts mounted on it are clamped in adjusted position by the clamping bolt and handle 12 and 13 the said bolt 12 working in a slot 14 in the upper part of the base. The gauge 5 is secured by screws 15 in a bracket 16 secured to a part of the carriage 7 and its operating member 6 bears against a vertical projection 17 on the member 18 at the upper part of the resilient member 2. The resilient member 2 at its upper part carries at its rear the stylus lever 19 this being the first of a system of two multiplying levers and this lever is supported on the pivot strut 20 at its front end, is limited in its lateral oscillatory movement by the vertical pillars 21, 21 between which it oscillates and carries at its rear end a vane 22 located in a body 23 of slightly viscous liquid. 24 is the second of the two multiplying levers which is supported by the pin point bearings 25. The two levers are flexibly coupled together by the strut member 26 having pin point bearings in the two levers in combination with the springs 27 connected with and in tension between the two levers. These springs may be connected to members rigidly secured to the levers 19, 24 as diagrammatically indicated in Figures 1, 2 and 3 but it is preferred that as shown in Figures 4 and 5 (Figure 4 being a side view partly in section and Figure 5 a horizontal sectional view) the said springs be connected to yokes 28 which bear by pin point bearings in opposition to the pin point bearings of the strut 26 between the levers. The lever 24 carries at its rear a vane 29 similar to the vane 22 and similarly immersed in slightly viscous liquid 30 and at its front the lever 24 is fashioned and acts as an indicating pointer working over a fixed scale 31 on the carriage. The mandrel is rotated by the worm 32 gearing with a worm wheel 33 on the mandrel. The worm 32 is on the rotatory shaft 34 which at its outer end is provided with a micrometer device 35,—not shown in Figures 1 and 3. In order that the worm 32 shall work accurately the inner end of the shaft 34 works between a spherical thrust bearing 36 and a ball thrust bearing 37 and a spring 38 is provided in compression between a fixed part and a collar 39 fixed on the shaft 34. The shaft 34 is carried in plain bearings 40 in brackets on a member 41 and in a third bearing 42 at the outer end in a plate which is secured by screws on the outer end part of the member 41 this third bearing being secured in position after the shaft 34 is in position in the bearings 40 whereby perfect alignment of the three bearings is secured. In order that the correct lateral position of the shaft 34 with relation to the worm wheel 33 may be secured and adjusted to take up wear in the worm and worm wheel gear the member 41 has inclined surfaces 44 at its sides abutting against similar surfaces on the inner faces of the part of the base adjacent so that on longitudinal adjustment of the member 41 by means of the screw nuts and screw at 45, the member 41 with the worm carried by it are moved slightly laterally. The set screws 46 work through slots in the member to admit of this movement or adjustment.

Provisions are made for interchangeable styli having work engaging parts of different diameters and shapes according to the gear or the like which is to be tested. For this purpose the styli preferably have tapered stems as shown at 47 in Figure 6 for engagement in a corresponding recess and with screwed extremities to engage with a screw nut 48 in a recess in the front part of the lever 19. The said nut 48 is of a slight floating character and therefore the engagement does not interfere with the true seating, with equality of pressure, of the tapered parts of the styli in their tapered seats. In order to avoid danger of injury to the lever during interchange of the styli and to facilitate that act provision is made according to the invention temporarily to hold the said lever during the act referred to. This provision consists of a hole 49 in the lever 19 and a vertically operating plunger 50 beneath, which may be raised and lowered by a crank, crank shaft and handle shown at 51.

When the stylus 1 is engaged against the resilience of the blade or plate spring 2 in the space between two teeth of a gear with the spherical extremity of the stylus bearing against the sides of the two teeth at about the pitch circle points the rotary dial of the dial gauge 5 is set to zero and then on turning the gear wheel being tested by turning the mandrel 4 by the worm gear 32, 33 the stylus 1 rides over the crown of the adjacent tooth, enters the next space and bears against the teeth on each side. If the stylus enters this second space exactly to the same extent it entered the first space then the indicator of the dial guage will again assume the zero position and the operator will know that the pitch circle through the arc of two spaces and one tooth is concentric but if not then the degree of variation from concentricity in the pitch circle will be indicated. If in the case of the first space the pitch circle therethrough is at that part of the correct diameter other positions of the gauge indicator will not only indicate variation from concentricity of the correct pitch circle, but also indicate whether such variations be within or without the correct concentric pitch circle. Any lateral movement of the stylus 1 against the torsional resilience of the blade 2 causes the lever pointer 24 to move over the scale 31, therefore when the stylus is engaged as aforesaid between two teeth and the position of the stylus is truly symmetrical relatively to the two teeth, the lever 24 is in normal position or at a zero. When the gear wheel is rotated the lever pointer 24 when next at zero will indicate when the stylus is truly symmetrically engaged in the next space and so on as necessary for gauging concentricity and the micrometer device 35 will show whether or not the distances travelled by the gear wheel tooth by tooth for so locating the stylus symmetrically in each space are exactly equal the one to the others and if not what is the measurement of the variations. Consequently the pitch of the teeth may be gauged and variations therein measured.

The dial 35ª (see Fig. 2) of the micrometer is removable and interchangeable with others and is secured in position by clamping screws one of which is shown at 35ᵇ. Differently graduated dials are conveniently provided for different diameters of gear wheels or the like.

The liquid 23, 30 is preferably non-oxidizing or lubricating oil or glycerine.

Figures 7 and 8 illustrate an arrangement in which the mandrel 4 may be tilted for the purpose before referred to. In this arrangement the mandrel with the worm and worm wheel gear for operating it may be moved along and adjusted in any position on the arcuate support 52 the edge of which is provided with a scale of angles co-operating with an indication on the mandrel mounting so that the particular angle at which the mandrel is tilted in the plane of the scale may be ascertained. The mandrel mounting is provided with a V projection at its foot engaging and working in a corresponding recess on the inner side of the arcuate member and the mandrel and its mounting is clamped in adjusted position by a clamping device of which 53 is the operating handle this handle turning a horizontal spindle which has an eccentric connection with a T headed bolt the head of which is located in a corresponding slot in the inner face of the arcuate member 52. Therefore when dealing with an ordinary bevel gear wheel the mandrel may be angularly arranged until the pitch line of each tooth may be moved in a vertical plane across the path of the stylus when the bevel wheel is rotated. The arcuate member 52 is formed with a flat base 54 which rests on a horizontal table 55 and the mounting of the said arcuate member on the said table is such that the arcuate member with the parts carried by it may be turned round horizontally on the centre 56 in order that the teeth of helical gears may be adjusted to be vertical which is desirable in dealing with them. The member 52 is secured in its adjusted horizontal position by the hand screw nut 63. The table 55 is provided with the scale 57 around it co-operating with an indication on the arcuate member whereby the relative angular position of the movable parts supported by the said table may be ascertained. The table 55 is at the upper part of a vertical support 58 and this vertical support is arranged to be slidable vertically along the side of the base support 59 for the machine. The vertical support 58 is moved and adjusted in the proper position by means of a toothed pinion 60 mounted in it engaging with a toothed rack 61 on the side of the base support and the said pinion is rotated by means of the hand gear 62 and when so adjusted is clamped in its adjusted vertical position by any suitable means. The vertical adjustment described is useful inasmuch as it admits of the gear to be gauged being suitably adjusted and secured on the mandrel 4 and the mandrel being adjusted in tilted position as may be required while the vertical support is in its lower position and then the parts may be raised and secured in the required position so that the gear wheel is on the correct level to enable the stylus to act on its tooth when the mandrel is rotating.

What I claim and desire to secure by Letters Patent of the United States is:—

1. In a gauging or testing machine, the combination of a stylus for bearing on the work, a resilient member by which the said stylus is carried so as to be displaceable against resilience in a direction substantially normal to the work and also in a direction angularly transverse to the aforesaid direction, a gauge controlled by the said stylus to indicate variation in the position of the stylus in a direction substantially normal to the work and independently of any displacement of the stylus in an angularly transverse direction, and means enabling the surface of the work to be passed in contact with the stylus.

2. A gauging or testing machine comprising in combination a resilient blade, a stylus carried by the said blade to make contact with the surface of the work, the resilience of said blade permitting of displacement of said stylus in a direction substantially normal to the work and in a direction angularly transverse to said direction, a gauge operated and controlled by movement or disposition of the said stylus in said direction normal to the work to indicate the position of the said stylus in the said direction, and a member on which the work is carried to enable the surface of the work to be passed in contact with the said stylus.

3. A gauging or testing machine comprising in combination a resilient blade, a stylus carried by the said blade to make contact with the surface of the work, the resilience of said blade permitting of displacement of said stylus in a direction substantially normal to the work and in a direction angularly transverse to said direction, a dial gauge comprising a rectilineally operable member, and a member carried by the said blade to transmit movement of the said blade to the said rectilineally operable member of the gauge to indicate variations in the position of the stylus in the said direction normal to the work, and a member on which the work is carried to enable the surface of the work to be passed in contact with the said stylus.

4. A gauging or testing machine, comprising a stylus to bear on the work and displaceable in a direction substantially normal thereto and also in a direction angularly transverse to the aforesaid direction, a gauge controlled by movement or disposition of said stylus in said normal direction, means to indicate the position of said stylus in said angularly transverse direction, a rotary member on which the work is carried, means to rotate the said member, and a micrometer device to indicate the degree of rotational movement of the work.

5. A gauging or testing machine, comprising a stylus to bear on the work and displaceable in a direction substantially normal thereto and also in a direction angularly transverse to the aforesaid direction, a gauge controlled by movement of the said stylus in said normal direction, means to enable the surface of the work to be passed in contact with said stylus, a lever carried with the stylus and extending to the rear thereof and another lever flexibly coupled to the first named lever near the rear end thereof and fulcrumed to indicate in a multiplied manner the lateral movement of the stylus in said angularly transverse direction.

6. A machine for the purpose described comprising a resilient blade, a stylus carried by said blade and resiliently displaceable in a direction to and from the work and also in a direction angularly transverse to the said direction, a dial gauge having a reciprocable operating member, a member carried with the stylus, controlling said reciprocable member, to indicate by the dial gauge the position of said stylus in a direction towards or from the work, a lever member carried with the said stylus and to the rear thereof, another lever disposed to the side of the first named lever, a flexible coupling between the two levers near their rear ends, said second lever being fulcrumed to indicate by its free end to a multiplied degree angular displacement of said stylus, a rotatable member to carry the work, means to releasably secure the work on said rotatable member, worm and worm wheel gearing to rotate said rotatable member, and a micrometer device in combination with said gearing to indicate the degree of rotational movement of the work.

AXEL CHARLES WICKMAN.